(12) United States Patent
Chen

(10) Patent No.: US 10,916,111 B2
(45) Date of Patent: Feb. 9, 2021

(54) SECURITY SYSTEM AND METHOD FOR MERCHANDISE SECURITY

(71) Applicant: Hangzhou Langhong Kechuang Technology Co., Ltd., Zhejiang (CN)

(72) Inventor: Binfeng Chen, Zhejiang (CN)

(73) Assignee: Hangzhou Langhong Kechuang Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/597,844

(22) Filed: Oct. 9, 2019

(65) Prior Publication Data

US 2020/0126377 A1    Apr. 23, 2020

(30) Foreign Application Priority Data

Oct. 19, 2018 (CN) .......................... 2018 1 1221094

(51) Int. Cl.
| | |
|---|---|
| *G08B 13/14* | (2006.01) |
| *E05B 73/00* | (2006.01) |
| *G07C 9/00* | (2020.01) |
| *G08B 13/24* | (2006.01) |
| *G08B 25/00* | (2006.01) |
| *H04L 29/06* | (2006.01) |

(52) U.S. Cl.
CPC .......... *G08B 13/14* (2013.01); *E05B 73/0017* (2013.01); *G07C 9/00309* (2013.01); *G08B 13/2434* (2013.01); *G08B 25/008* (2013.01); *H04L 63/0853* (2013.01)

(58) Field of Classification Search
CPC .. G08B 13/14; G08B 13/2434; G08B 25/008; G08B 13/1409; G08B 13/2402; E05B 73/0017; G07C 9/00309; H04L 63/0853; H04W 12/06; H04W 4/06; H04W 4/35; H04W 4/70
USPC ....................................... 340/568.1
See application file for complete search history.

(56) References Cited

U.S. PATENT DOCUMENTS

| | | | |
|---|---|---|---|
| 9,171,441 B2 | 10/2015 | Fawcett et al. | |
| 9,269,247 B2 | 2/2016 | Fawcett et al. | |
| 9,501,913 B2 | 11/2016 | Fawcett et al. | |
| 2006/0145848 A1* | 7/2006 | Marsilio ............ | G08B 13/2402 340/568.2 |
| 2007/0001845 A1* | 1/2007 | Ott ........................ | G08B 13/149 340/568.1 |
| 2012/0021684 A1* | 1/2012 | Schultz .................. | G08C 17/02 455/41.1 |

(Continued)

*Primary Examiner* — Hirdepal Singh

(57) ABSTRACT

The present invention provides a system and method of merchandise security. The system includes a security device, comprising at least a first communication interface, configured to be capable of simultaneously communicating with one or more controllers. A controller, comprising at least a second communication interface configured to be capable of communicating with one or more security devices simultaneously. The method uses a controller with system identity number to initialize the security device which directly or indirectly attached to the merchandise, and to operate the initialized device. The present invention can realize communication between the security device and the controller through a wireless channel, in the communication process, through the generation of the system identity number, the security device can simultaneously implement the point-to-point communication and a point-to-surface communication.

17 Claims, 10 Drawing Sheets

(56) References Cited

U.S. PATENT DOCUMENTS

| | | | | |
|---|---|---|---|---|
| 2014/0305828 A1* | 10/2014 | Salvo | ............... | G08B 13/1654 |
| | | | | 206/459.1 |
| 2015/0048945 A1* | 2/2015 | Fawcett | ............... | G08B 13/12 |
| | | | | 340/571 |
| 2018/0035827 A1* | 2/2018 | Grant | ............... | G08B 13/1445 |
| 2018/0365453 A1* | 12/2018 | Hartway | ............... | G06F 21/31 |
| 2019/0244451 A1* | 8/2019 | Favier | ............... | G06Q 20/203 |

\* cited by examiner

| | | system identity number | | |
|---|---|---|---|---|
| Parameter Name | Channel Number | Address Number | | |
| | | Communication Code | Device Code | Privilege Code |
| Parameter Length | 1 Byte | 2 byte | 2 byte | 1 byte |
| Function | used as communication channel of devices in security system | used as communication code of devices in security system | used for identification of devices in security system | used for identification of devices in security system |
| Parameter Setting | Controller Initialization Settings (to avoid mutual interference of multiple security systems in the same environment) | Controller Out-of-factory Settings (to avoid address repetition of multiple security systems in the same environment)) | | |
| Uniqueness | unique in security system | unique in security system | non-unique | non-unique |
| Default Parameter of Electronic Keys | 0x00 | 0x0001~0x9999 Out-of-factory Settings | 0x000000 | 0x00 |
| Default Parameter of Security Device Broadcasting Parameters of Electronic Keys | 0x00 | 0x00 | 0x000000 | 0x00 |

FIG. 10

| Packet format | | | | | |
|---|---|---|---|---|---|
| Name | Preamble | Address | Packet control | Payload | Check |
| Length | 1 byte | 5 byte | 1 byte | 0~32 byte | 1 byte |

FIG. 11

| Payload format | | | |
|---|---|---|---|
| Name | Source Device code | Command | Data |
| Length | 2 byte | 1 byte | 0~29 byte |

FIG. 12

| Address Setting | | | |
|---|---|---|---|
|  | System Code | Device Code | Privilege Code |
| Point-to-point Communication | 0x1234 | 0x5678 | 0xFF |
| Privilege Broadcasting | 0x1234 | 0x0000 | 0x01 |
| System Broadcasting | 0x1234 | 0x0000 | 0x00 |

FIG. 13

SECURITY SYSTEM AND METHOD FOR MERCHANDISE SECURITY

CROSS REFERENCE TO RELATED APPLICATIONS

The present application claims the benefit of Chinese Patent Application No. 201811221094.X filed on Oct. 19, 2018, the contents of which are incorporated herein by reference in their entirety.

FIELD OF THE INVENTION

The present invention relates to a merchandise security system.

BACKGROUND OF THE INVENTION

With the development of a merchandise experiential service, the display and experience functions of a merchandise are more open to a buyer or a potential buyer, and at the same time, the demand for merchandise security will continue to increase. On one hand, the various needs of the experiencer shall be met as much as possible, and the experiencer is shown with all the functions and the most convenient side of the merchandise as much as possible, on the other hand, we shall be beware of possible theft of possible people, and reduce as much as possible and even eliminates a hidden danger that may exist in the process of display and experience.

In the prior art, in the field of merchandise security, in order to ensure that the merchandise is in a safe state, some security devices or security systems are generally used, for example, U.S. Pat. Nos. 9,171,441, 9,501,913, and 9,269,247 and the related patents thereof provide a method that is considered to be relatively safe in the prior art, for this method, a programming station and a programmable key are set together, a security code is generated by the programming station, and the security code is transmitted to a memory of the programmable key, and the programmable key first transmits the security code to the memory of a security apparatus, then when the memory in the security apparatus matches the security code in the memory of the programmable key, the programmable key can be set to control the security apparatus, and the security code can be sent through an infrared, electrical contact or induction transmission method. In this way, the security code is unique for a security system, this method overcomes certain security issues, such as an EAS security device commonly used in a supermarket, which can be unlocked using a general-purpose tool without uniqueness, this can lead to an intermix of unlockers between different retail stores, and there is a security hole. Moreover, in the disclosure of the patent documents, the problem of setting the number of uses and time is also mentioned, for example, a timer can be set for the programmable key or the security device, and the programmable key and/or the security device can be deactivated after a predetermined period of time, a counter is used, which disables a programmable button after a predetermined maximum number of activations, thereby enhancing security.

This way of programmatically programming the programmable key and then activating and controlling the security device by the programmable key is more reliable from a security point of view, but from the practicality of the security system and from the perspective of scalability, there are many practical problems, for example, the security system is equipped with 4-5 programmable keys, after programming this batch of programmable keys, the scope of use of the security system is limited to a plurality of the programmable keys and cannot be extended, once one of the programmable keys is lost, the entire system needs to be reset or replaced. Moreover, the merchandise display security is increasingly applied to an electronic product industry with a display interface, an important feature of the electronic product industry is that a product is updated quickly, new products are frequently listed, and it is necessary to continuously add a new security merchandise and/or security equipment to the security system, the system needs to be very scalable at this time. Moreover, this method is still a peer-to-peer mode, and it is impossible to form a corresponding management chain for regional management, which is obviously limited in operation and use.

SUMMARY OF THE INVENTION

The technical problem to be solved by the present invention is to provide a security system and method for merchandise security against the problems existing in the background technology, which can effectively improve the applicability and expansion performance of the system under the premise of ensuring security.

To this end, the present invention adopts the following technical solutions:

In one aspect of the present invention, the present invention provides a security system for merchandise security, including:

A security device comprising at least a first communication interface configured to be capable of simultaneously communicating with one or more controllers, the security device communicating with other devices within the security system by setting a first communication interface thereon, for example, a controller, or a sensor, or even an external device is also available.

The security device can be attached directly or indirectly to a merchandise and configured to trigger a security signal when the integrity of the security device is damaged.

A controller comprising at least a second communication interface configured to be capable of communicating with one or more security devices simultaneously; wherein the controller communicating with other devices within the security system by setting a second communication interface thereon for example, security equipment, or the sensor, or even the external equipment is also available.

The controller is configured to be capable of performing the operations of locking and unlocking the security device and placing the security device in an operational state and/or in an inoperable state.

In some preferred embodiments, the controller may perform the above operation on the security device in a communication mode set by the security system, and for example, according to a certain communication rule, establish and communicate with the security device, and the security device is configured to receive communication from the controller or instructions according to a rule set by the security system. In some preferred embodiments, such communication rules are established by the security system and for the security system, such communication rules are specific but are extensible, for example, for a communication protocol, the security system can formulate a communication protocol for the communication within the system, the security system can ensure the security in the security system by setting the communication protocol, and at the same time can accommodate the device capable of communicating under the communication protocol, thereby improving the expansion and compatibility of the security system.

The first communication interface and the second communication interface are configured to be capable of communicating by a protocol method including a system identity number.

The system identity number of the present invention is a unique transmission identification code for inter-device communication of the present invention, and the system identity number includes a channel number and an address number.

Further, the system identity number includes at least one channel number configured to identify a communication channel between devices in the security system, the channel number is a wireless system channel number, and the channel number is generated by the controller. The default channel number of the controller is a default broadcast channel number. When a system channel number needs to be generated, the controller first sets a starting channel number and writes the starting channel number to the wireless module in the controller. Then, the controller performs carrier detection to detect whether there is carrier interference in the current channel. If there is no the carrier interference, the channel number is used as the channel number of the system; if there is the carrier interference, the channel number will be transformed to the next adjacent channel and then perform the carrier detection. Until the channel with no carrier interference or less interference is detected, the channel number thereof is used as the channel number of the system.

Further, the system identity number includes at least one communication address configured for identification when communicating between the devices within the security system.

Further, the communication address includes at least one communication code configured for system identification of inter-devices communication within the security system.

Further, the communication address includes at least one device code configured for device identification between the devices within the security system.

Further, the communication address includes at least one privilege code configured to be used for privilege recognition of inter-devices communication within the security system; as one preference, the privilege include, but is not limited to, a region privilege, a category privilege, and a management privilege.

Taking a single device as an example, for example, the controller address number is generated as follows:

The controller has a default initial address number as all 0, for example, 000, the default initial address number is used in the default broadcast for communication between an uninitialized controller and an uninitialized device.

During communication, the controller takes the lower 2 Bytes of the self serial number thereof as the communication code of the system, and sets both the device code and the privilege code as 0, which is the system broadcast address number. The system broadcast address number can broadcast data to the device throughout the system.

The controller takes the lower 2 Bytes of the self serial number thereof as the communication code of the system, and sets the device code as 0, and the privilege code is set to the preset privilege value, which is the privilege broadcast address number, and the privilege broadcast address number has certain privilege, which can broadcast data to the device within a certain range.

The controller takes the lower 2 Bytes of the self serial number thereof as the communication code of the system, and sets both the device code and the privilege code as all 1, which is an uninitialized M2M address number. The uninitialized M2M address number cannot be used normally and can be used normally only when device-related information needs to be obtained and the M2M address number is completed. The controller needs to send the uninitialized M2M address number together with the privilege broadcast address number to the device through the default broadcast channel, and the device will return the device's self serial number. According to the serial number of the device, the controller takes the lower 2 bytes of the serial number as the device code, and the communication code and the privilege code remain unchanged, that is, the M2M address number. The M2M address number is used for communication between the controller and the device.

The process of generating the device identification code in the system identity number is as follows:

When the device is not initialized, the address number is the default initial address number, which is the address number of all 0, at the same time, the address number is in the default broadcast channel and receives the information of the controller. When the device receives the uninitialized M2M address number, a privilege broadcast address number, the channel number and other information sent by the controller, the device first completes the uninitialized M2M address number, and fills the device code by using the lower 2 Bytes of the self serial number thereof, so that the device can be perfected. At this point, the M2M address number has been generated, and the privilege broadcast address number is also sent by the controller, only the system broadcast address number is not set. The system broadcast address number can be obtained by changing the privilege code from the privilege broadcast address number to be 0, so the privilege code of the privilege broadcast address number is cleared to obtain the system broadcast address number. After obtaining three address numbers, the device needs to set corresponding three wireless receiving channels. The M2M address number is used to set the channel 0 address to get the M2M channel; the privilege broadcast address number is used to set the channel 1 address to get the privilege broadcast channel; the system broadcast address number is used to set the channel 2 address to get the system broadcast channel. The device uses these 3 channels to receive controller information or send data information to the controller. Generally, the system broadcast channel and the privilege broadcast channel are used to receive broadcast information of the controller. The M2M channel is used to receive commands from the controller or send the data to the controller. Then, the self serial number is replied to the controller so that the controller completes the uninitialized M2M address number. Finally, a switching channel is the channel pointed to by the channel number established by the controller.

At this point, the system identity number of the entire device is generated, and the generated system identity number is placed into inter-devices communication in the security system.

Further, the communication protocol between the first communication interface and the second communication interface includes a data packet format including a synchronization word, an address number, a control code, a payload, and a check.

Further, the system identity number is built into each device in the security system as a communication method of the device in the security system.

Further, the controller includes at least one button configured to be used for a user input operation, and at least one pointing apparatus configured to be used for displaying an operational state of the controller.

In a second aspect of the present invention, the present invention provides a security method for merchandise security, the security method initializes a security device capable of attaching directly or indirectly to an item by a controller with a system identity number, and performs the operations of locking and unlocking initialized security device and placing the initialized security device in an operational state and/or an inoperable state.

Further, the security method identifies the operation privilege of the controller by using the system identity number, and the system identity number can be generated by using the foregoing method, for each device, a system identity number can be provided, and is placed throughout the communication process.

Further, the security method identifies the communication address of the security device by the system identity number as described in the first aspect. In some preferred embodiments, in the security method, the security system is capable of identifying a communication address that matches the format in the system identity number.

Further, the security device can be operated by one or more controllers at the same time, the controller can simultaneously operate one or more security devices, and can achieve a point-to-point control when one controller communicates with one security device, when one controller communicates with a plurality of the security devices, the point-to-surface control can be implemented, when a plurality of the controllers communicate with a plurality of the security devices, sub-privilege control can be implemented. In some preferred embodiments, the controller can implement the region control based on the communication address of the security device.

Further, the initialization selects a channel with less interference as a channel number, and the selected channel can be always used in subsequent communication. In some preferred embodiments, after the initialization is initiated, the controller first performs channel selection, and the channel number is selected as the channel number in the system identity number after the channel is selected.

Further, the initialization is performed by the wired or wireless communication, and during an initialization process, the controller selects a channel for communicating with the security device.

Further, the initialization is performed by means of the wired or wireless communication.

In some preferred embodiments, communication can be performed between the devices within the security system by a wireless manner. The wireless manner includes WIFI, Bluetooth, GSM, etc. In some preferred embodiments, the system security code can set that the controller and the security device in the same WIFI mode can communicate, or can set that communication can be performed within the Bluetooth communication range, in some preferred embodiments, the communication range of the system can be set by the address number in the system security code, the address number is used to determine whether the security device is within the communication range of the system, once the communication range is exceeded, the security device cannot be recognized as a device in the security system. In some preferred embodiments, the communication range of the system can be set through the communication channel of the system, and the same security device as the system communication signal can be recognized by the security system.

In another aspect of the present invention, the present invention provides a controller for merchandise security, the controller comprising at least one communication interface configured to be capable of simultaneously communicating with one or more security devices through a protocol method including one system identity number.

The controller is configured to be capable of performing the operations of locking and unlocking the security device and placing the security device in the operational state and/or in the inoperable state.

Further, the system identity number includes at least one communication address configured for identification when communicating between the devices within the security system.

Further, the communication address includes at least one communication code or device code configured to be system identification for inter-device communication within the security system; the device code is configured for device identification between the devices within the security system.

In the present invention, the system security code can be placed in the controller by referring to the foregoing method, and becomes a specific device in the security system.

In another aspect of the present invention, the present invention provides a security device for merchandise security, the security device includes at least one communication interface configured to be capable of simultaneously communicating with one or more controllers by the protocol method including one system identity number The security device can be attached directly or indirectly to the merchandise and configured to trigger the security signal when the integrity of the security device is damaged;

The controller is configured to be capable of performing the operations of locking and unlocking the security device and placing the security device in the operational state and/or in the inoperable state.

Further, the system identity number includes at least one communication address configured to be used for identification of inter-device communication within the security system; in some preferred embodiments, the communication address includes at least one communication code or device code, the communication code is configured for system identification for the inter-device communication within the secure system; in some preferred embodiments, the device code is configured for the device identification between devices within the secure system.

Similarly, in the present invention, the security device can also be placed into the system security code by referring to the foregoing method, and becomes the specific device in the security system, after the system security code is placed in the security device, the security device can be controlled by the controller specified in the security system, this particular control is exclusive within the scope of the system security code, but this particular control is scalable and compatible, once a new device needs to be replaced or introduced, the device can be configured separately according to the above configuration, or if a device (such as a controller) is lost or leaving the communication range of the system, the communication with other devices in the system cannot be established, and the security device cannot be controlled, and correspondingly, if a controller other than the controller within the security system (a controller without the system identity number or with the different system identity number) enters the security system, the device in the security system cannot be controlled to ensure security because the communication protocol does not match.

The beneficial effects of the invention are as follows:

(1) The present invention can realize communication between the security device and the controller through a wireless channel, in the communication process, through the generation of the system identity number, the security device can simultaneously implement the point-to-point communication and a point-to-surface communication, so that in the whole system, the controller can control the security device independently or communicate with and transmit information with a plurality of the security devices at the same time.

(2) The wireless communication mode of the present invention includes a broadcast mode and a privilege mode, when the present invention is broadcasted, the system identity number includes the channel number, in the system, the communication between the security device and the controller is performed according to the system identity number, and communication of other devices other than the system identity number is excluded to ensure communication security within the security system.

(3) The controller of the present invention first communicates with the security device through the broadcast mode to obtain a communication privilege with the security device, before the device communicates, the controller first selects the channel, selects a channel with less interference to communicate, and records channel number to ensure the stability and security of the communication.

(4) The present invention sets an address number for defining the communication address and the communication privilege in the system identity number, identifies the communication address where the device for communication is located by the address number, identifies a communication privilege of the communication device by the address number, so that the controller is capable of controlling the security device with the privilege in a hierarchical manner to form the security system with an overall control rule, so that the present invention can be applied to various complicated merchandise security sites.

BRIEF DESCRIPTION OF THE DRAWINGS

FIG. 10 is a structural view of a system identity number of the present invention.

FIG. 11 is a view of a data packet format of the present invention.

FIG. 12 is a view of a format of a payload of the present invention.

FIG. 13 is a view of an example of communication address setting in the present invention.

DETAILED DESCRIPTION

Figure 1:
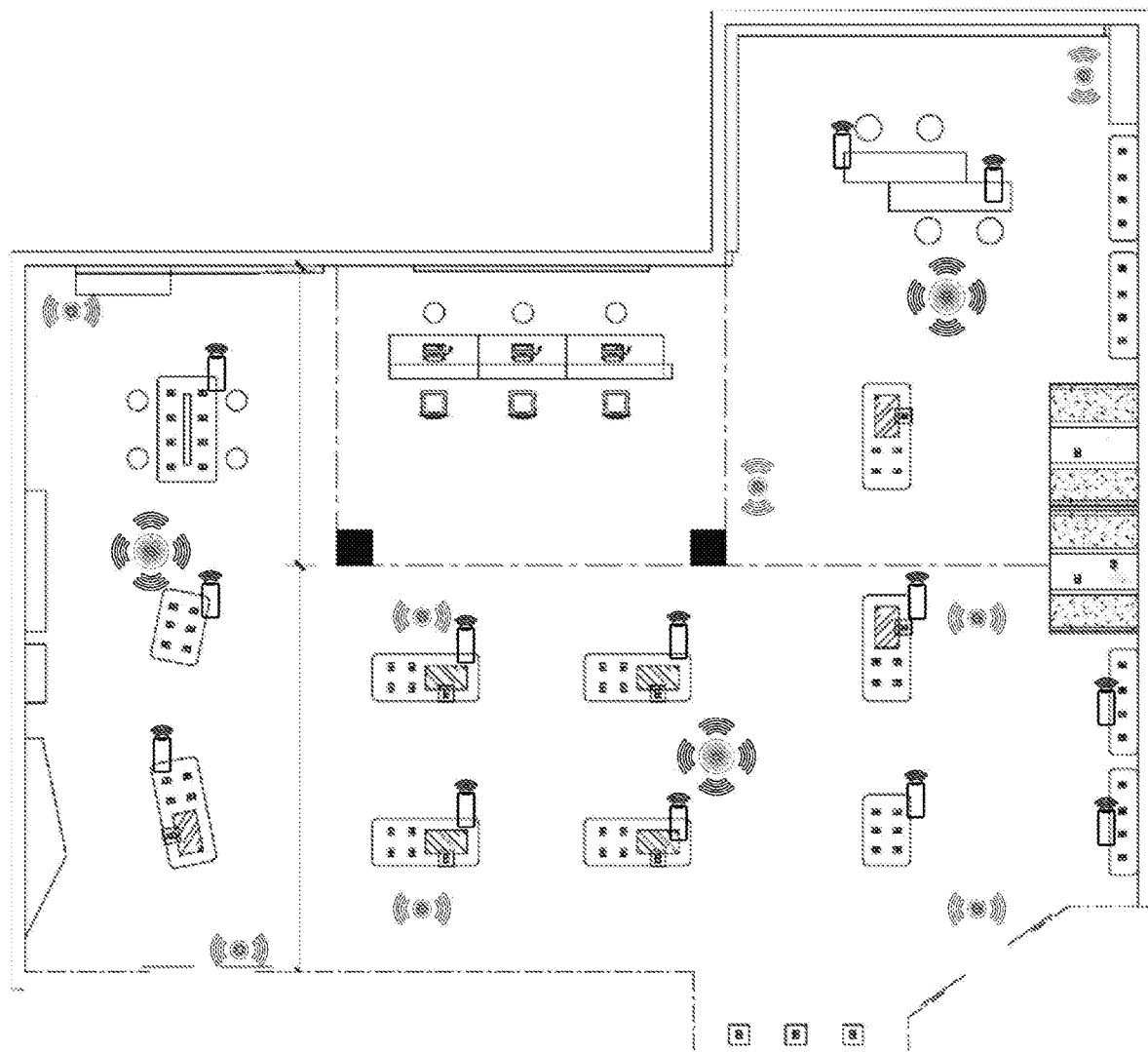
FIG. 1 is a view of one typical implementation site of the present invention.

The embodiments of the present invention are further described in detail below with reference to the accompanying drawings, it should be noted that the examples are only illustrative of the present invention and should not be construed as limiting the present invention.

The technical terms involved in the present invention are explained in conjunction with the embodiments, and the terms are explained in order to enable a person skilled in the art to more accurately understand the technical solutions of the present invention, the explanation of the terms is not limited by the scope of protection of the present invention.

Merchandise Security

The merchandise security referred to in the present invention can be used for some merchandise that need to be functionally displayed to a buyer or a potential buyer, such as an electronic product, and some functions of these merchandise need to be allowed for the user to understand during use, these merchandise usually have some human-computer interactive interfaces, and an exhibitor can contact these merchandise in a certain range and can demonstratively use all or part of the functions of these merchandise to understand the performance of the merchandise, in the industry, such a merchandise with a functional display requirement is sometimes referred to as the merchandise with an experience requirement, that is, the exhibitor can operate and experience the merchandise displayed under limited conditions and scope, so these merchandise will be directly contacted by the experiencer, the experiencer can use the merchandise within the scope limited by the seller or the owner of the merchandise, such as a sales place, but cannot take the merchandise away from an experience place, because the ownership of the displayed merchandise belongs to the seller or the owner of the merchandise, it is necessary to perform security measures, these security measures do not limit the use of the experiencer, but only limit the experiencer to take the merchandise away from the site, even in some cases, these security measures need to be considered as far as possible not to hinder the use of the experiencer, so that the experiencer can get a better use of the experience, which is different from the carry-on security of the items in a volume sales. The merchandise security in the present invention can also be used in some ways that do not require experience, just display or sale, such as a rack for displaying and storing the merchandise, and can also be covered by the merchandise security of the present invention, moreover, the merchandise security in the present invention may also include a region that does not require experience or display, such as a storage region of the merchandise, or, for example, a cabinet for storage, wherein if the merchandise is stored, the cabinet may also be protected by an security lock of the present invention. The same security is not to set the merchandise lock on the merchandise itself, but through some controllable security system or security settings, from the overall layout and the method of the ability to remotely or closely unlock the merchandise, the merchandise is performed with security. In a sense, the security in the present invention can be an security concept of a region or a place.

Safe State/Unsafe State

The concept of merchandise security is to keep the merchandise in a safe state, in the event that the merchandise is in an unsafe or potentially unsafe state, an alert is required to alert the sales staff or display staff. The safe state or the unsafe state referred to in the present invention refers to the state in which the merchandise is displayed, in particular, the state in which the association of the merchandise with an security apparatus is displayed when the security apparatus is installed, in general, the state that the merchandise is considered not to be stolen is called the safe state, the state that the merchandise may be stolen is called the non-safe state, is the security measures intact? Is the merchandise under the protection of security measures? If yes, then the merchandise is considered to be a safe state. If not, then the merchandise is a non-safe state, that is to say, this safe or unsafe state can be relative to security measures, for example, the security measure is that the merchandise always remains connected with a charging interface, then the sensor detects if the charging interface is always connected to the merchandise, if it is, the merchandise is in a safe state, if the merchandise is disconnected, the merchandise is in the unsafe state; or, if the security measure is that the merchandise is always kept in a charged state, then, the sensor detects whether a charging cable of the merchandise maintains power transmission, if yes, the merchandise is in the safe state, if not, the merchandise is in the unsafe state; or, if the security measure is that the merchandise is clamped by a clamping apparatus, the sensor detects whether the merchandise is in a clamping space or whether the merchandise is in contact with the clamping apparatus or installed, if yes, the merchandise is in the safe state, if not, the merchandise is in the unsafe state; and so on.

Controller

In the field of the merchandise security, the controller is to some extent an unlocking device, when an security device such as an alarm device sounds an alarm, the alarm device can be turned off by the controller to unlock the alarm device and stop the alarm, this is one function of the controller, in some cases, the security device may set a switch, and the security function will be activated when the switch is turned on, when the switch is turned off, the alarm will be stopped, in some cases, the controller can also control such turn on/off. Most controllers can function as the unlocking device and the switch.

Figure 2:
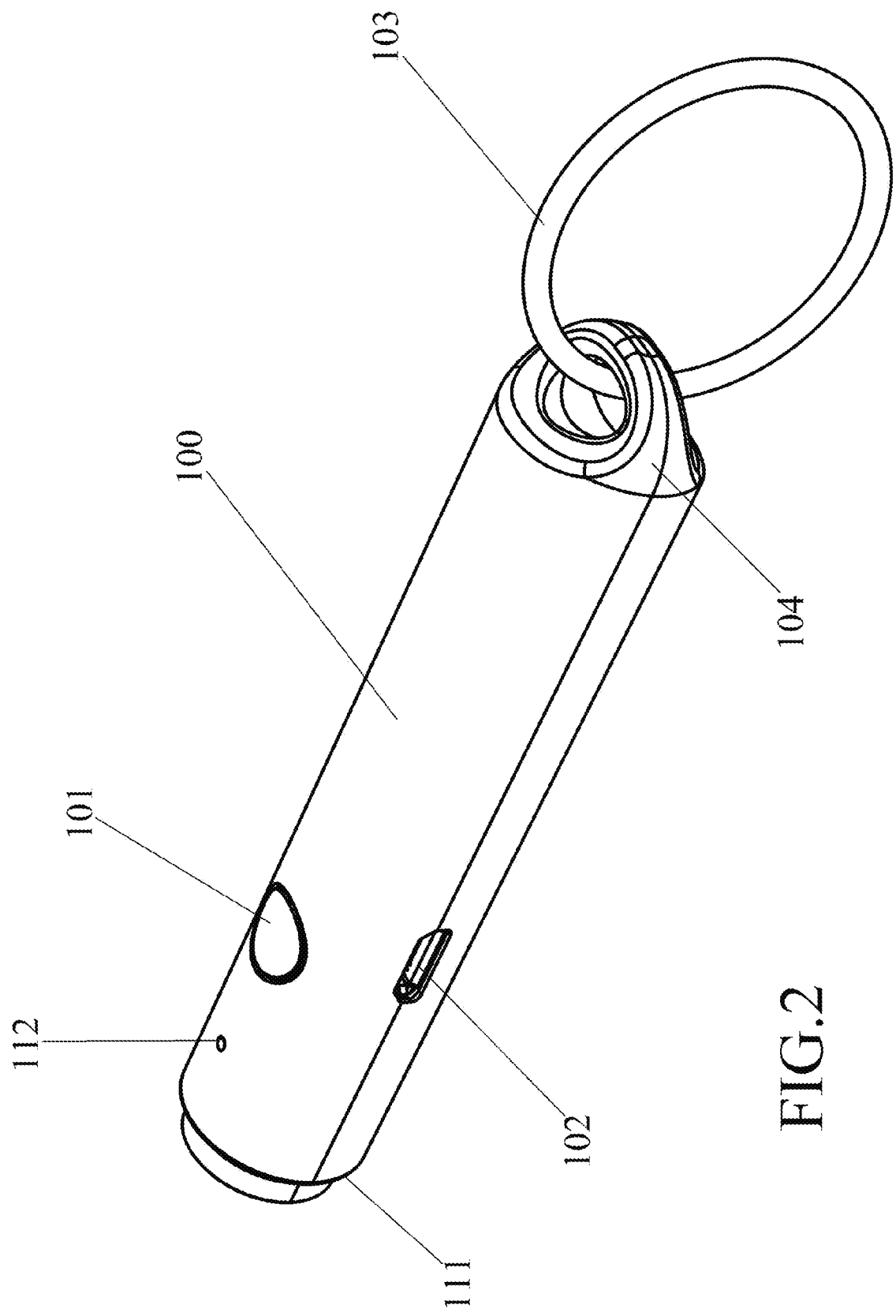
FIG. 2 is a view of one typical embodiment of a controller of the present invention.
Figure 3:
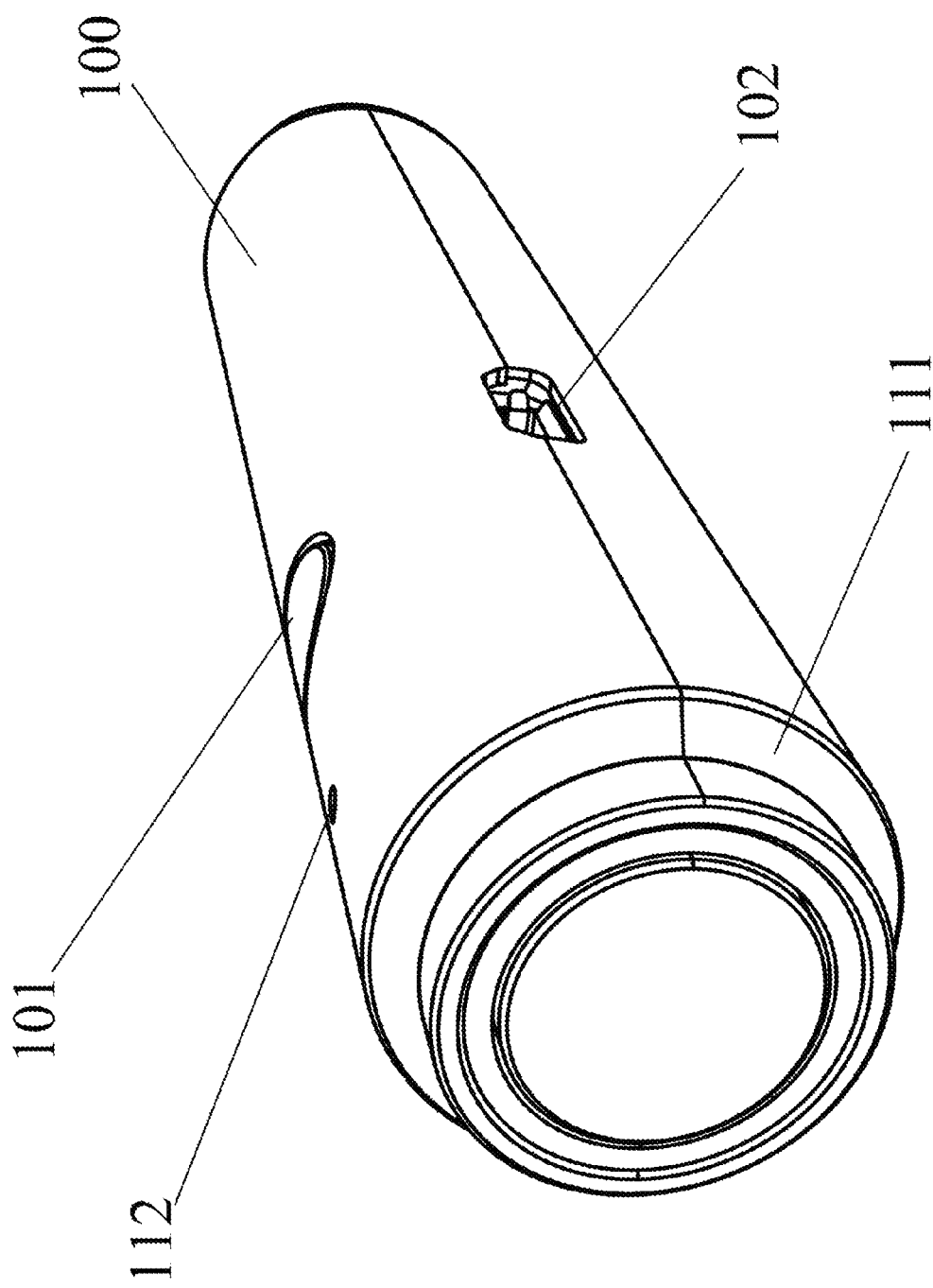
FIG. 3 is a view of FIG. 2 from another angle.

The controller may have a hardware device, such as the form shown in FIGS. 2-3, the controller 100 can be provided with at least one button 101, the button 101 can be used to turn the controller 100 itself on or off, and can also be used to activate or deactivate the control of a security apparatus by the controller 100. In some preferred embodiments, the controller 100 can also have a charging interface 102 and can be powered by a power adapter. In some preferred embodiments, the charging interface 102 can also serve as a data interface for the controller to communicate externally. In some preferred embodiments, the controller 100 can also be provided with a pulling ring or a hanging loop 103, the controller 100 is provided with a nesting portion 104 for allowing the hanging ring 103 to be positioned, and the hanging ring 103 can be rotated in the nesting portion 104. In some preferred embodiments, the side surface of the controller 100 is provided with the button 101, the button 101 is arranged on one side surface of a housing, and the middle portion thereof is slightly closer to the outer end, this is ergonomically designed for the user to press the button with one finger while grasping the housing, which is convenient in operation. In some preferred embodiments, the location of the charging interface 102 can be staggered from the button 101 to avoid interference during use. In some preferred embodiments, an indicator light 112 may be arranged on the outer surface of the controller 100, the indicator light 112 can be arranged at a position between the button 101 and the outer end 111 of the controller, which is conveniently viewed by the user and plays a prompt role.

Security Apparatus

The security apparatus, as the name thereof suggests, is an apparatus that is set up for security. In the present invention, the security apparatus mainly refers to some devices used in the field of merchandise security, which can play a certain role in the security of the merchandise, or can play a certain role in a certain part of the merchandise security, such as an alarm device, when the merchandise is in the unsafe state or is considered to be in the unsafe state, the alarm device will give an alarm sound or an audible and visual alert signal; for example, the sensor can be used to sense whether the merchandise is in the safe state; for example, the locking device of the merchandise can directly act on the merchandise and limit the merchandise to a state considered to be safe. In short, the security apparatus is in the security system to control and manage the merchandise that need to be secured, so that the merchandise requiring security is in the safe state or the state that is considered to be safe, and the controller can operate the security apparatus to perform the locking or unlocking operation for the security device (for example, an item lock), or manages the state of the security apparatus, determines whether the security apparatus is operable or inoperable, which is the control of the security apparatus itself.

System Identity Number

The system identity number is a communication code set in the present invention for communication of devices in the security system. In some preferred embodiments, the system identity number can be placed into the security device and/or the controller. In some preferred embodiments, the system identity number can be used directly for communication within the security system. As shown in FIG. 10, in some preferred embodiments, the system identity number (SID) of the present invention can include a channel number and an address number, and the channel number refers to a channel number for communication between devices in the security system, in a wireless communication, the appropriate channel is selected for communication, which can avoid possible interference factors. In some preferred embodiments, the controller selects a channel with less interference for communication when initializing the security device, and records the channel number as part of the system identity number for subsequent communication. In some preferred embodiments, the same security system uses a unique channel number, if a plurality of the security systems exist in the same wireless network, the controllers in different security systems choose a wireless communication channel different from other security system when initializing the security device to avoid mutual interference of wireless communication within the same network, and also ensure communication security within each security system, for example, if three security systems share the same wireless network for communication, three different channel numbers can be selected, respectively.

In some preferred embodiments, the address number can include a communication Code, a device Code, and a privilege code, as shown in FIG. 13. In some preferred embodiments, the channel number is a communication code used for communication between the devices in the security system, after selecting an appropriate channel, the device in the same security system can identify the communication address of the controller in the security system through the channel code, and through the communication address, can further ensure that the device in the security system does not establish security communication with the controller outside the security system, and is controlled by the controller outside the security system. Since the communication of the security device needs to be limited within a certain system, the device in the same system can allow all or part of the communication, but in different security systems, cross control is usually not allowed, for a communication system, the unique communication address is used to identify the device in the system through the communication address, which can effectively ensure the security in the security system.

In some preferred embodiments, the communication is encoded as a low 2 Bytes of the serial number built into the controller. In some preferred embodiments, the device is encoded as the lower 2 Bytes of the device serial number. In some preferred embodiments, the privilege code is a system preset value. In some preferred embodiments, the privilege in the present invention includes a region privilege, a merchandise category privilege, a control personnel privilege, and the like. In some preferred embodiments, the above privileges are set for different security devices and/or the controllers by different privilege codes. In some preferred embodiments, the address number of the present invention can include multiple levels of the address numbers. In some preferred embodiments, the address number hierarchy of the present invention can be ranked according to the degree of distinction between the system and the system, the device and the device, and the region and region. In a preferred embodiment, the system address number of the present invention can include three levels of the address numbers: a system broadcast address number, a privilege broadcast address number, and an M2M address number. In some preferred embodiments, the M2M address number can be used for point-to-point communication. In some preferred embodiments, the privilege broadcast address number can be used to communicate with the security device in a certain region. In some preferred embodiments, the privilege broadcast address number can be used to communicate with the security device on the merchandise associated with a certain class/brand. In some preferred embodiments, the privilege broadcast address number can be used to communicate with the security device that belongs to a certain administrative privilege. In some preferred embodiments, the system broadcast address number can be used to communicate with all security devices in the entire security system.

Figure 5:
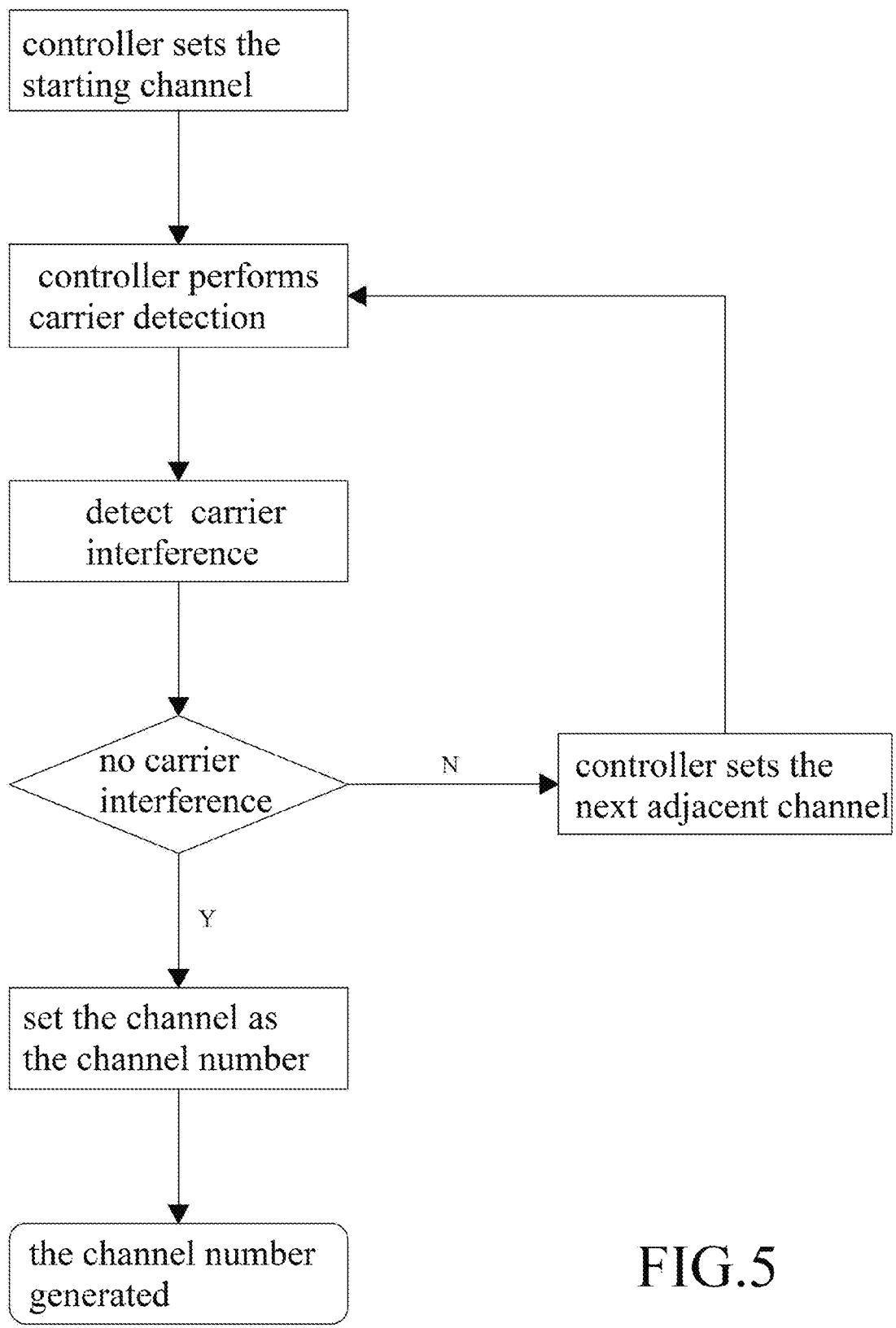
FIG. 5 is a flow chart of a generation of a channel number in the present invention.

In some preferred embodiments, as shown in FIG. 5, the channel number is generated by the controller, and the channel number of the controller defaulted when leaving the factory is the default broadcast channel number, when the system channel number needs to be generated, the controller first sets the starting channel number, and write the starting channel number to a wireless module in the controller, after that, the controller performs carrier detection to detect if the current channel has carrier interference; if there is no the carrier interference, the channel number is used as the channel number of the system; if there is the carrier interference, the carrier is detected by transforming to the next adjacent channel until the carrier with no carrier interference or less interference is detected, and the channel number thereof is used as the channel number of the system.

Figure 6:
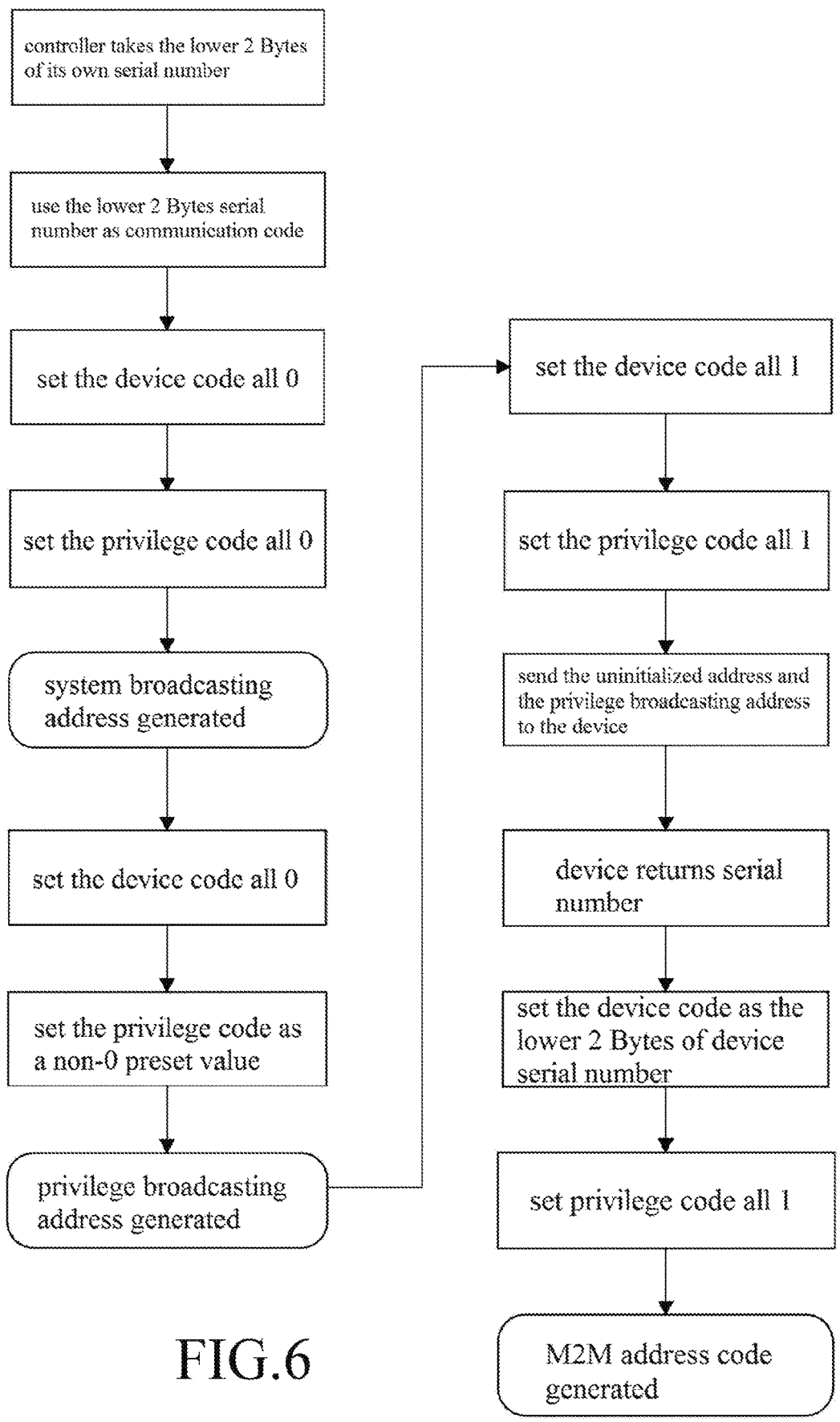
FIG. 6 is a flow chart of a generation of an address number in a controller.

In some preferred embodiments, the controller's address number is generated as shown in FIG. 6, and the controller has a default initial address number, which is all zeros. The default initial address number is used in the default broadcast for communication between an uninitialized controller and an uninitialized device.

In some preferred embodiments, when the address number is generated, the controller takes the lower 2 Bytes of the self serial number thereof as the communication code of the system, and sets both the device code and the privilege code to be 0, that is, the system broadcast address number. The system broadcast address number can broadcast data to the device throughout the system.

In some preferred embodiments, when generating the address number, the controller takes the lower 2 Bytes of the self serial number thereof as the communication code of the system, and sets the device code to be 0, and sets the privilege code to the preset privilege value, that is, the privilege broadcast address number. The privilege broadcast address number has certain privilege, and can broadcast data to the device within a certain range.

In some preferred embodiments, when the address number is generated, the controller takes the lower 2 Bytes of the self serial number thereof as the communication code of the system, and sets both the device code and the privilege code to all 1, that is, the M2M address number that is not initialized. The M2M address number that has not been initialized cannot be used normally and can be used normally only when the device-related information is obtained and the M2M address number is completed. The controller needs to send the uninitialized M2M address number together with the privilege broadcast address number to the device through the default broadcast channel, and the device returns the device's self serial number. According to the serial number of the device, the controller takes the lower 2 bytes of the serial number as the device code, and the communication code and the privilege code remain unchanged, that is, the M2M address number. In some preferred embodiments, as previously discussed, the M2M address number can be used for controller-to-device communication.

In some preferred embodiments, the process of generating the security device identification code includes: when the security device is not initialized, the address number is a default initial address number, that is, the address number of all 0s, and is in a default broadcast channel, and receives the information of the controller. When the security device receives the uninitialized M2M address number, the privilege broadcast address number, the channel number and other information sent by the controller, the device first completes the uninitialized M2M address number and fills the device code by using the lower 2 bytes of the self serial number thereof. At this point, the M2M address number has been generated, and the privilege broadcast address number is also sent by the controller, only the system broadcast address number is not set. The system broadcast address number can be obtained by changing the privilege number from the privilege broadcast address number to be 0, so the privilege code of the privilege broadcast address number is cleared to obtain the system broadcast address number. After three address numbers are obtained, the device needs to set three corresponding wireless receiving channels. The M2M address number is used to set the channel 0 address to get the M2M channel; the privilege broadcast address number is used to set the channel 1 address to get the privilege broadcast channel; the system broadcast address number is used to set the channel 2 address to get the system broadcast channel. The security device uses these three channels to receive controller information or send data information to the controller. Generally, the system broadcast channel and the privilege broadcast channel are used to receive broadcast information of the controller. The M2M channel is used to receive a command from the controller or send data to the controller. Then, the self serial number is replied to the controller so that the controller completes the uninitialized M2M address number. Finally, the switching channel is the channel pointed to by the channel number established by the controller.

In some preferred embodiments, the system identity number is formed together when the channel number, the communication code of the controller, the device code of the security device, and the privilege code are generated.

Figure 4:
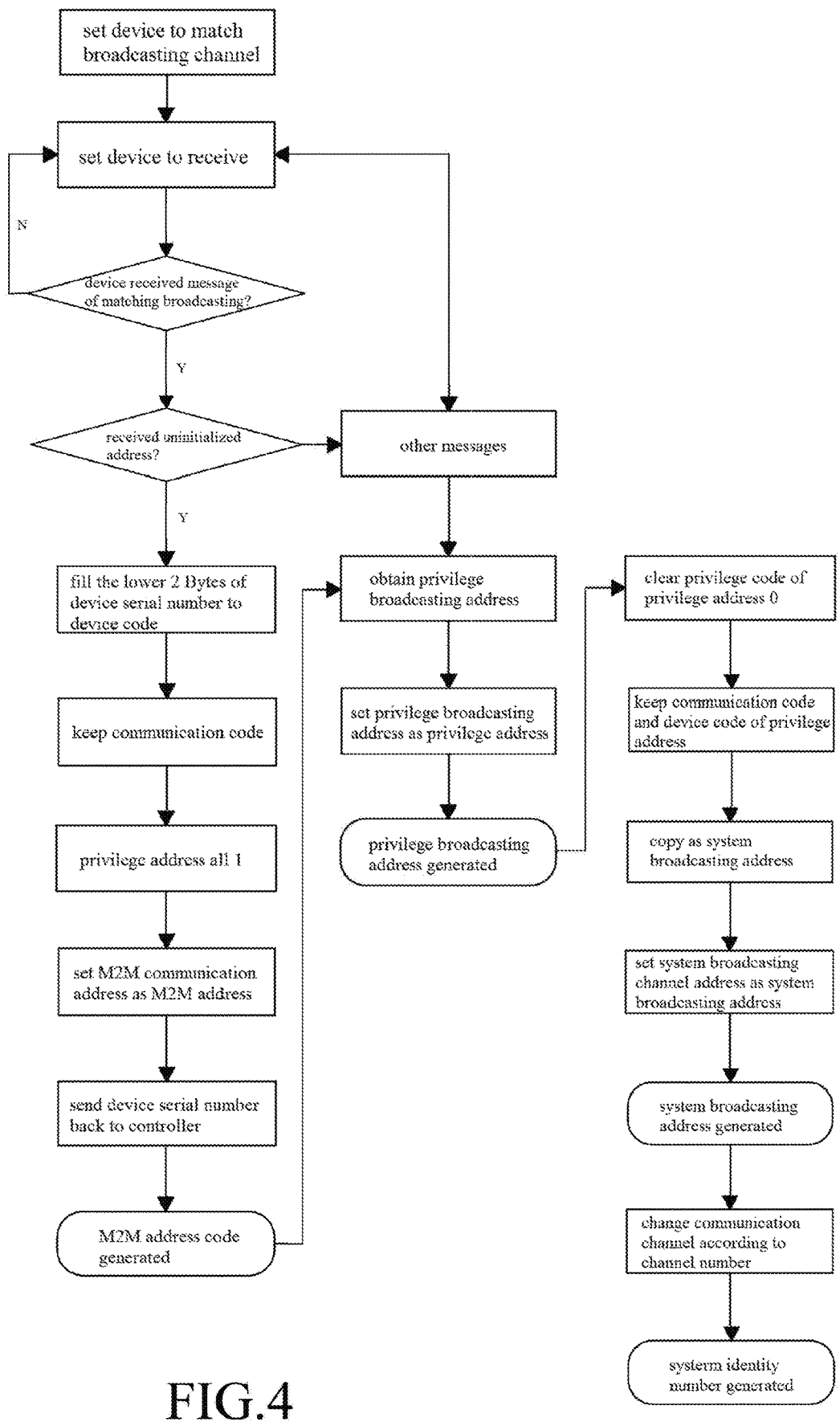
FIG. 4 is a flow chart of a generation of a system identity number in the present invention.

In some preferred embodiments, the entire generation process of the system identity number is as shown in FIG. 4, and includes the following steps: setting the security device in the security system to be in a paired broadcast channel; adjusting the security device in the security system to be in a receiving state; the controller sends the paired broadcast information to determine whether the device can receive the paired broadcast information. If yes, continue, if no, return to the previous step; determine whether the uninitialized address number can be received, and if yes, continue to the next step, if not, then feedback other information, and re-adjust the receiving state of the security device; filling the device code with the lower 2 bytes of the device serial number of the security device that receives the uninitialized address number; recording the communication code of the controller; setting the privilege code to all 1; setting the M2M communication address to be the M2M address number; sending the device serial number of the security device back to the controller; generating the M2M address number of the security device; obtaining the privilege broadcast address; setting the address of the privilege broadcast channel to the privilege broadcast address number; generating the privilege broadcast address number; clearing the privilege number in the broadcast address number; retaining the communication code and device code in the broadcast address number; copying the reserved code as the system broadcast address; setting the system broadcast address as the system broadcast address number; generating the system broadcast address number; converting the communication channel according to the channel number; and generating the system identity number according to the channel number, the M2M address number, the broadcast privilege address number, and the system privilege address number.

Figure 7:
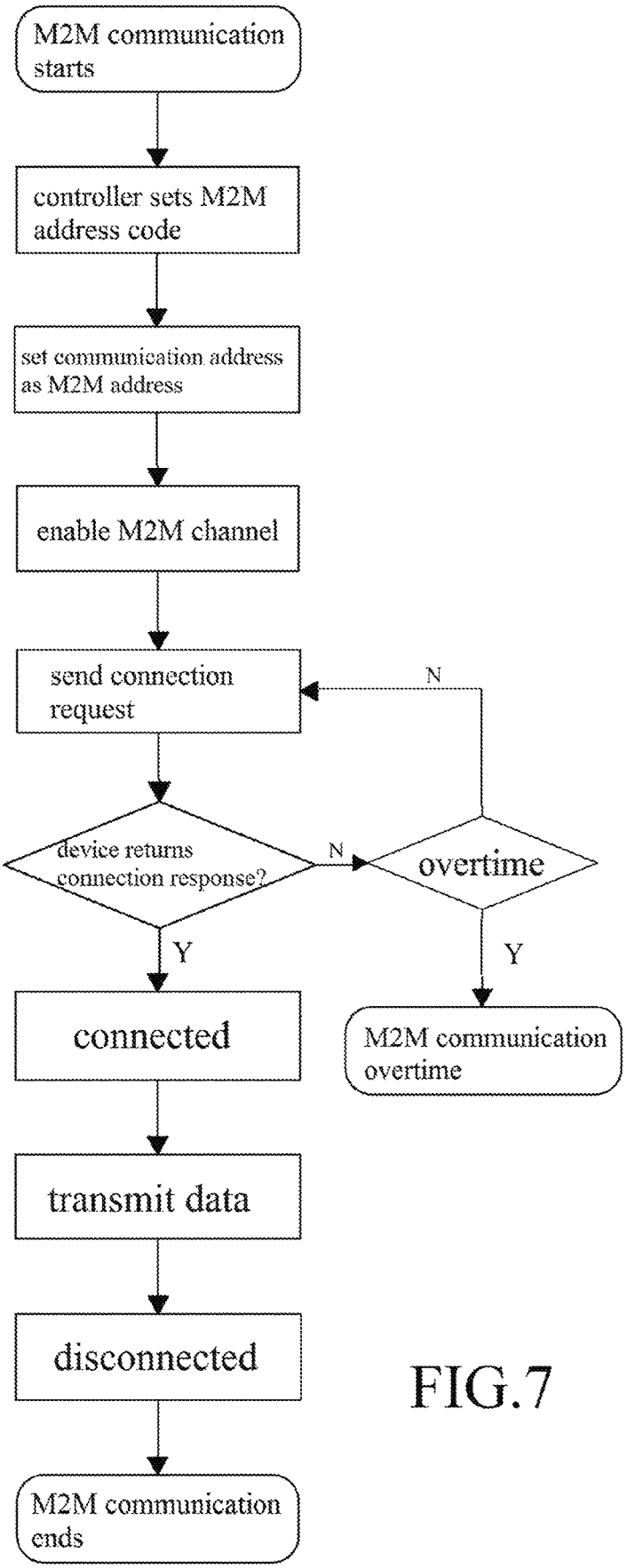
FIG. 7 is a view of an M2M communication mode between a controller and a security device.

In some preferred embodiments, the M2M communication mode between the controller and the security device is as shown in FIG. 7, when the controller performs M2M communication with the device, the controller channel address is set to be the M2M address number, and communicates in the channel where the channel number is the system channel number. In some preferred embodiments, the controller initiates a connection request in the M2M channel, and the security device responds the connection request to the controller after receiving the connection request in the M2M channel, and the connection establishment is completed. After that, the controller and the security device can perform command transmission and information exchange in the M2M channel. The security device with a different channel number cannot establish a connection with the controller. The security device with the different M2M channel address number cannot receive related information sent by the controller on the M2M channel. In some preferred embodiments, the communication mode of the M2M is adapted to the point-to-point communication mode between the security device and the controller, for example, in some cases, the controller can independently control a certain security device according to the requirements of the security system.

Figure 8:
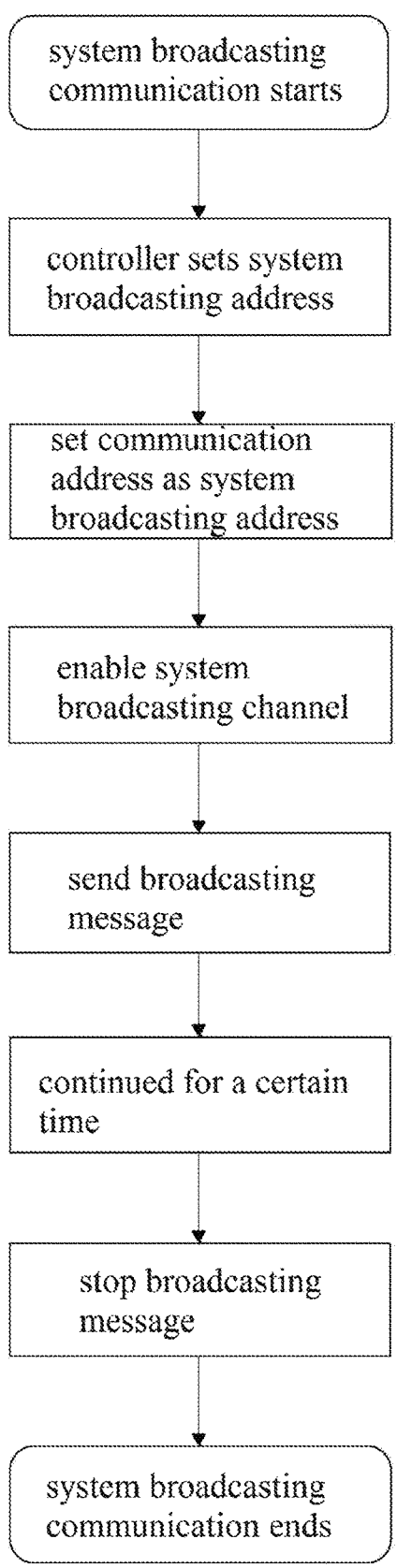
FIG. 8 is a view of a system broadcast communication between a controller and a security device.

In some preferred embodiments, the system broadcast communication mode between the controller and the security device are shown in FIG. 8, when the controller and the security device perform system broadcast communication, the controller channel address needs to be set as the system broadcast address number, and performs system broadcast in the channel where in the channel number is the system channel number. The security device receives the system broadcast sent by the controller in the system broadcast channel and then acts accordingly. The security device with the different channel number cannot receive system broadcast information. The security device with a different system broadcast channel address number cannot receive the system broadcast information in the system broadcast channel. In some preferred embodiments, the security device with the same system broadcast address numbers but the different security broadcast address number or the different M2M address number can receive the system broadcast information in the system broadcast channel. In some preferred embodiments, the communication mode of the system broadcast is applicable to a wide range of communication methods between the security device and the controller (e.g., one-to-many, point-to-surface, etc.), for example, in some cases, depending on the requirements of the security system, the controller can control a plurality of the security devices simultaneously.

Figure 9:
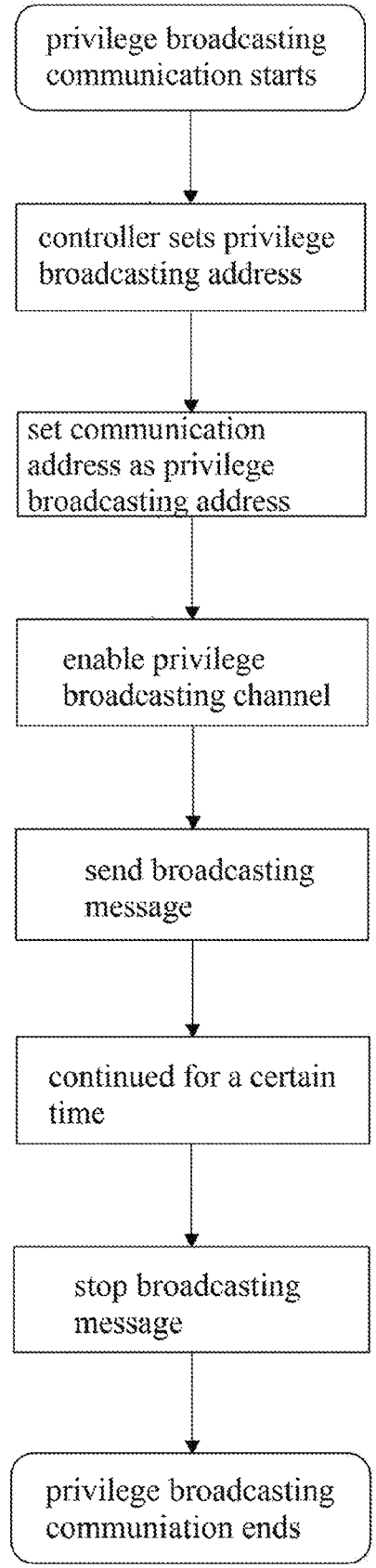
FIG. 9 is a view of a privilege broadcast communication between a controller and a security device.

In some preferred embodiments, the privilege broadcast communication mode between the controller and the security device is shown in FIG. 9, when the controller performs the privilege broadcast communication with the security device, the controller channel address needs to be set as the privilege broadcast address number and performs he privilege broadcast in the channel where the channel number is the system channel number. The security device can receive the privilege broadcast sent by the controller in the privilege broadcast channel and then acts accordingly. The security device with the different channel number cannot receive the privilege broadcast information. The security device with the different privilege broadcast channel address number cannot receive the privilege broadcast information in the privilege broadcast channel. In some preferred embodiments, the security device with the same privilege broadcast address number but the different M2M address number can receive the privilege broadcast information in the privilege broadcast channel. In some preferred embodiments, the system broadcast communication mode is suitable for a privileged communication mode between the device and the controller.

In some preferred embodiments, as shown in FIG. 11, the communication data packet of the controller and the security device in the present invention can include a Preamble, an Address number, a Packet Control Code, and a Payload and a Check. In some preferred embodiments, as shown in FIG. 12, the payload in the data packet of the present invention can include a Source Device Code, a Command Word, and a Data. In some preferred embodiments, the communication between the controller and the security device in the present invention is implemented by packetizing, delivering, receiving, and unpacking the above data packet.

In some preferred embodiments, FIG. 1 is a view of a typical implementation site of the present invention, in which a plurality of regions, a plurality of types of display merchandise, and a merchandise cabinet are provided, and the present invention is applied in the sales/display site shown in the figure, and each of the displayed merchandise/merchandise cabinets can be configured with one security device that is controlled by the same or different controllers.

What is claimed is:
1. A security system for merchandise security, comprising;
    a security device including at least a first communication interface configured to be capable of communicating with one or more controllers simultaneously; and a controller comprising at least a second communication interface configured to be capable of communicating with one or more security devices simultaneously;

the first communication interface and the second communication interface are configured to be capable of communicating by a protocol comprising a system identity number;

the security device is capable of being attached directly or indirectly to the merchandise and configured to trigger a security signal when the integrity of the security device is damaged;

the controller is configured to be capable of performing the operations of locking and unlocking the security device and placing the security device in an operational state and/or in an inoperable state;

wherein the system identity number comprises at least one channel number configured to identify a communication channel between devices within the security system.

2. The security system for the merchandise security according to claim 1, wherein the system identity number comprises at least one communication address configured for identification when communicating between the devices within the security system.

3. The security system for the merchandise security according to claim 2, wherein the communication address comprises at least one communication code configured for system identification of inter-device communication within the security system.

4. The security system for the merchandise security according to claim 2, wherein the communication address comprises at least one device code configured for device identification between the devices within the security system.

5. The security system for the merchandise security according to claim 2, wherein the communication address comprises at least one privilege code configured for privilege identification for inter-device communication within the security system; as one preference, the privilege includes, but is not limited to, a zone privilege, a category privilege, and a management privilege.

6. The security system for the merchandise security according to claim 1, wherein a communication protocol between the first communication interface and the second communication interface comprises a data packet format comprising a synchronization word, an address number, a control code payload, and a check.

7. The security system for the merchandise security according to claim 1, wherein the system identity number is built into each device within the security system.

8. The security system for the merchandise security according to claim 1, wherein in the security system, the controller having the system identity number initializes the security device that is configured to be attached directly or indirectly to a merchandise, and performs the operations of locking and unlocking the initialized security device and placing the initialized security device in the operational state and/or in the inoperable state.

9. The security system for the merchandise security according to claim 8, wherein the security system identifies an operational privilege of the controller by means of the system identity number.

10. The security system for the merchandise security according to claim 8, wherein the security system identifies the communication address of the security device by means of the system identity number.

11. The security system for the merchandise security according to claim 8, wherein in the security system, the security device is capable of being simultaneously operated by one or more controllers, the controller is capable of operating one or more security devices simultaneously.

12. The security system for the merchandise security according to claim 8, wherein the initialization selects a channel with less interference as a channel number.

13. The security system for the merchandise security according to claim 8, wherein the initialization is performed by wired or wireless communication.

14. A controller for merchandise security, comprising
at least one communication interface configured to be capable of simultaneously communicating with one or more security devices by a protocol method comprising one system identity number;

the controller is configured to be capable of performing the operations of locking and unlocking the security device and placing the security device in an operational state and/or an inoperable state;

wherein the system identity number comprises at least one communication address configured for identification when communicating between devices within a security system.

15. The controller for the merchandise security according to claim 14, wherein the communication address comprises at least one communication code or device code, the communication code is configured for system identification of inter-devices communication within the security system; the device code is configured for device identification between the devices within the security system.

16. A security device for merchandise security, wherein
the security device comprising at least one communication interface configured to be capable of simultaneously communicating with one or more controllers by a protocol method comprising a system identity number;

the security device is configured to be attached directly or indirectly to the merchandise and configured to trigger a security signal when the integrity of the security device is damaged;

the controller is configured to be capable of locking and unlocking the security device and placing the security device in an operational state and/or in an inoperable state;

wherein the system identity number comprises at least one communication address configured for identification when communicating between devices within a security system.

17. The security device for the merchandise security according to claim 16, wherein the communication address comprises at least one communication code or device code, the communication code is configured for system identification of inter-devices communication within the security system; the device code is configured for device identification between the devices within the security system.

* * * * *